(12) United States Patent
Zock

(10) Patent No.: US 11,603,162 B2
(45) Date of Patent: Mar. 14, 2023

(54) AXLE BEARING CARRIER ASSEMBLY

(71) Applicant: Richard Mellick Zock, Lapeer, MI (US)

(72) Inventor: Richard Mellick Zock, Lapeer, MI (US)

(*) Notice: Subject to any disclaimer, the term of this patent is extended or adjusted under 35 U.S.C. 154(b) by 35 days.

(21) Appl. No.: 17/304,990

(22) Filed: Jun. 29, 2021

(65) Prior Publication Data

US 2022/0227449 A1    Jul. 21, 2022

Related U.S. Application Data

(60) Provisional application No. 63/199,690, filed on Jan. 18, 2021.

(51) Int. Cl.
| | |
|---|---|
| *B62K 25/28* | (2006.01) |
| *B62K 5/01* | (2013.01) |
| *B60G 21/05* | (2006.01) |

(52) U.S. Cl.
CPC ........... *B62K 25/28* (2013.01); *B60G 21/051* (2013.01); *B60G 21/052* (2013.01); *B62K 5/01* (2013.01); *B60G 2200/1324* (2013.01)

(58) Field of Classification Search
CPC ............... B60G 21/051; B60G 21/052; B60G 2200/1324

USPC ........................................... 180/217; 280/282
See application file for complete search history.

(56) References Cited

U.S. PATENT DOCUMENTS

| | | | | |
|---|---|---|---|---|
| 4,237,744 A | * | 12/1980 | Jolly ........................ | B62M 9/16 180/231 |
| 4,392,536 A | * | 7/1983 | Iwai ..................... | B62K 25/283 280/282 |
| 4,541,502 A | * | 9/1985 | Iwai ....................... | B62K 5/027 188/344 |
| 4,582,157 A | * | 4/1986 | Watanabe .............. | B62K 5/027 180/215 |
| 4,667,761 A | * | 5/1987 | Takayanagi ............. | B60T 1/065 188/344 |
| 4,714,453 A | * | 12/1987 | Takayanagi .......... | B62K 25/286 474/112 |
| 6,446,748 B1 | * | 9/2002 | Suzuki ................... | B62K 5/027 280/124.179 |
| 6,547,027 B1 | * | 4/2003 | Kalhok ...................... | B62J 1/12 180/215 |
| 7,007,960 B2 | * | 3/2006 | Chalin ................... | B60G 7/008 280/124.116 |

* cited by examiner

*Primary Examiner* — Paul N Dickson
*Assistant Examiner* — Tiffany L Webb
(74) *Attorney, Agent, or Firm* — Dunlap Bennett & Ludwig, PLLC

(57) ABSTRACT

An axle bearing carrier assembly having a swing arm of unitary construction that operatively associates with an adjustable tension plate for selectively connecting one of two different types of axle bearing carriers to the swing arm.

5 Claims, 4 Drawing Sheets

AXLE BEARING CARRIER ASSEMBLY

CROSS-REFERENCE TO RELATED APPLICATION

This application claims the benefit of priority of U.S. provisional application No. 63/199,690, filed 18 Jan. 2021, the contents of which are herein incorporated by reference.

BACKGROUND OF THE INVENTION

The present invention relates to all-terrain vehicles and, more particularly, an axle bearing carrier assembly for all-terrain vehicles.

The bearings on an all-terrain vehicle (ATV) are a critical machine element that constrains relative motion of the axle to only the desired motion and so reduces friction that otherwise may bear on the axle. ATV axle bearings are conveniently housed in an axle bearing carrier. Axle bearing carriers typically come in single connection form/type or dual connection form/type. The axle bearing carrier is operatively associated with the wheel suspension of the ATV by way of a swing arm.

Current swing arms include and/or are formed through the welding of a plurality of pieces along the discontinuities between the plurality of pieces. These discontinuities are weak points wherein the swing arm can crack and fail, possibly causing damage to surrounding components of the vehicle. And these weaknesses are under tremendous strain and stress due to the abuse that an ATV regularly endures. When forces are endured on a weld point or joint of two or more joined pieces of metal, they are subjected to fatigue that can result in stress fractures and/or points of failure that can ultimately fail, causing catastrophic damage to the machine and injury to the user.

Furthermore, existing swing arms are not adaptable to be used with both single connection and dual connection types of axle bearing carrier; rather, they are not interchangeable between the two. As a result, when a user replaces the axle bearing carrier, they are forced to purchase a specific axle bearing carrier type, limiting their options or leaving the enthusiast with no option if a specific style type is not readily available (depending on the model machine, as axle carrier will vary). In the case of the latter, an entire swing arm will need to be purchased, which can be costly.

As can be seen, there is a need for an axle bearing carrier assembly for an ATV, wherein the swing arm is of unitary construction, thereby obviating the need for joints and/or discontinuities in need of joining, welding, adhesion, or the like, and wherein the axle bearing carrier assembly includes a tension plate that operatively associates the swing arm and the axle bearing carrier. The swing arm is dimensioned and adapted to fit ATV, QUAD, 4-wheelers 2003-2014 SUZUKI LT-Z400, 2003-2006 KAWASAKI KFX400, 2004-2008 ARCTIC CAT DVX400 and the like. As a result of the swing arms and tension plate, the axle bearing carrier assembly is configured to engage either the single connection type or the dual connection type.

The swing arm may be a unitary piece of aluminum or other suitable material that does not have any welded parts. The adjustable tension plate has specifically placed interconnection point or holes to enable the use of either connection types of axle bearing carriers to operatively associate with the swing arm.

As a corollary, users of the present invention are not limited to either the single or dual connection types, which can be important for another reason: some users prefer to use only one type/style (single or dual) axle bearing carrier on their machine.

SUMMARY OF THE INVENTION

In one aspect of the present invention, an axle bearing carrier assembly includes the following: a swing arm having a housing; the housing having a front side defining, in part, a void housing an axle bearing carrier, wherein the axle bearing carrier has one or more connection points; an elongated opening disposed along the front side so as to be vertically aligned with the one or more connection points; and a tension plate having a plurality of interconnection points, wherein one or more of the plurality of interconnection points vertically align with the one or more connection points.

In another aspect of the present invention, the axle bearing carrier assembly further includes a top flange and a bottom flange further defining the void, wherein each flange has a plurality of mounting openings; and a tow plate associated with each flange, wherein the swing arm further comprises a rear portion for operatively associating with a suspension system, wherein the tension plate is on an opposing side of the front side relative to the axle bearing carrier; and having an adjustable fastener extending through the tension plate, through the elongated opening, and connecting to one of the one or more connection points, wherein the swing arm is a unitary construction.

In yet another aspect of the present invention, a method of enabling a swing arm to accommodate a single connection type axle bearing carrier and alternatively a dual connection type axle bearing carrier, the method includes providing a tension plate having a plurality of interconnection points; and forming an elongated opening along a front side of a housing of the swing arm, wherein the front side defines, in part, a void dimensioned for receiving the axle bearing carrier, wherein the single connection point of the single connection type aligns with the elongated opening and one of the plurality of interconnection points, and wherein the dual connection points of the dual connection type aligns with the elongated opening and two of the plurality of interconnection points.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
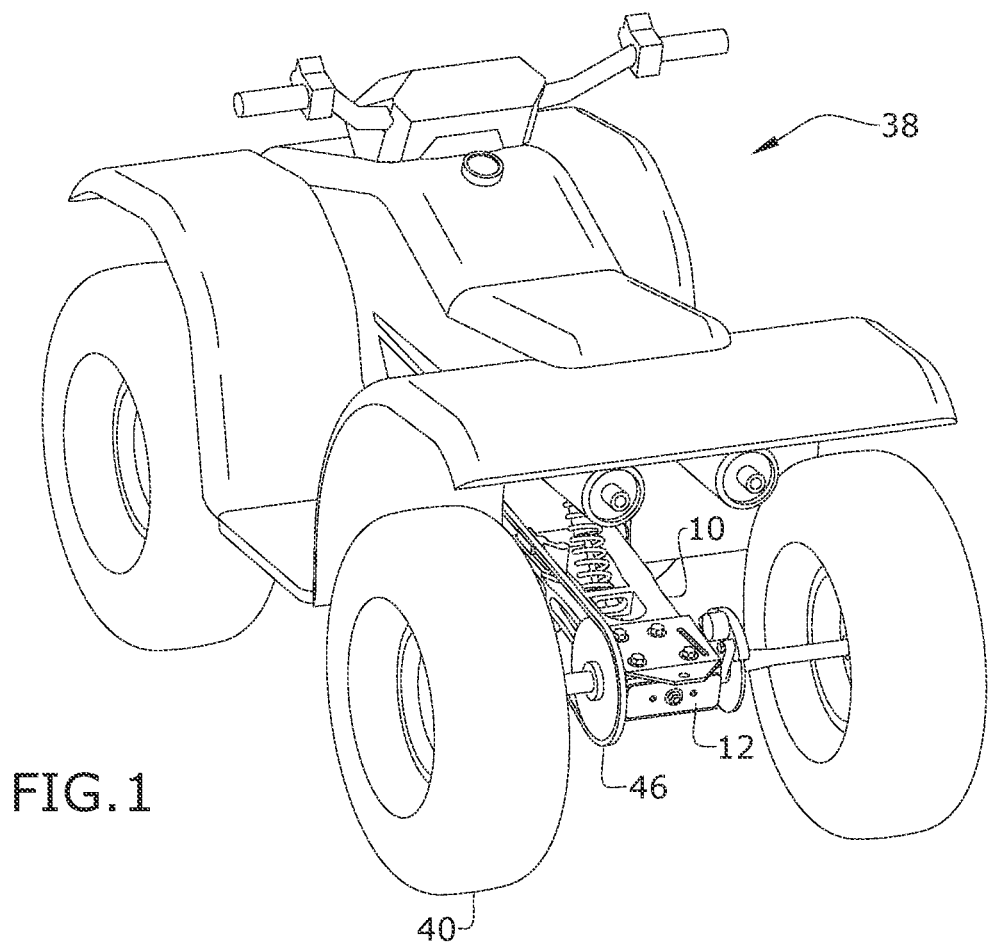
FIG. 1 is a perspective view of an exemplary embodiment of the present invention, shown in use.
Figure 2:
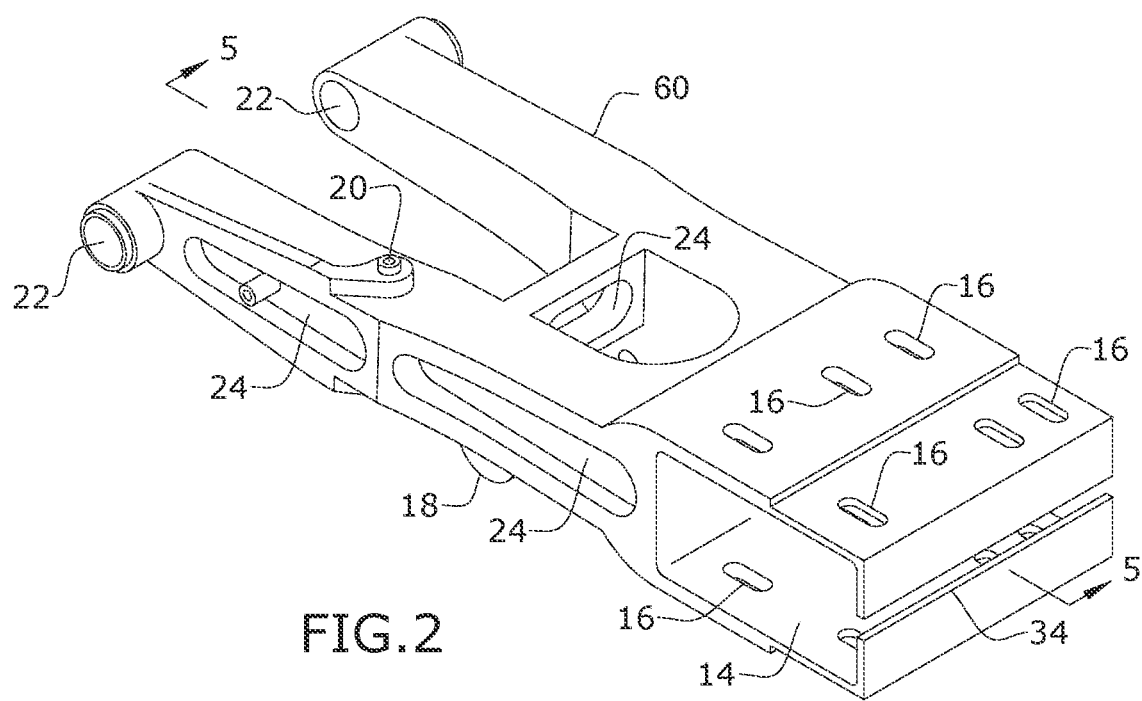
FIG. 2 is a perspective view of an exemplary embodiment of a swing arm of the present invention.
Figure 3:
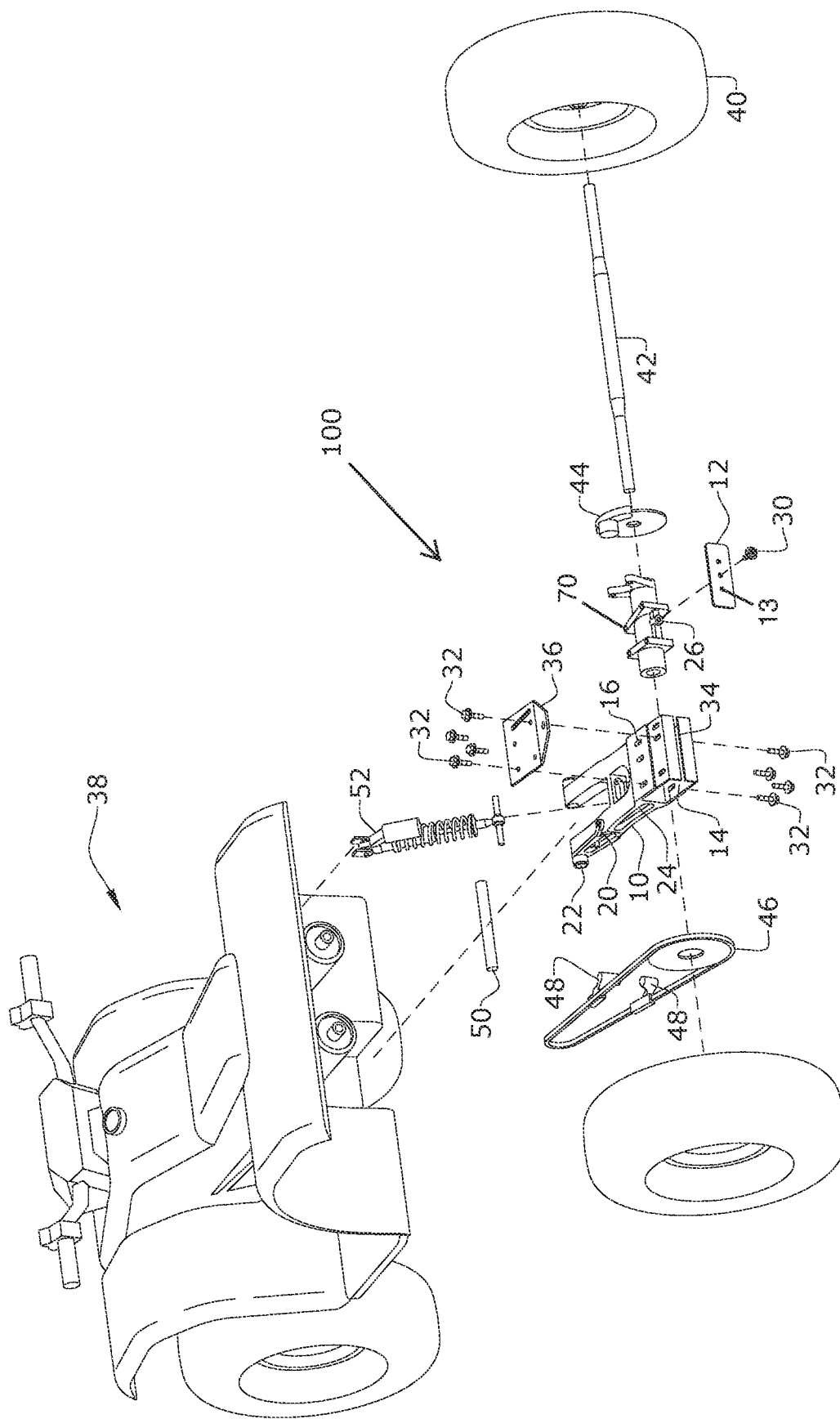
FIG. 3 is an exploded perspective view of an exemplary embodiment of the swing arm of the present invention, shown in use.
Figure 4:
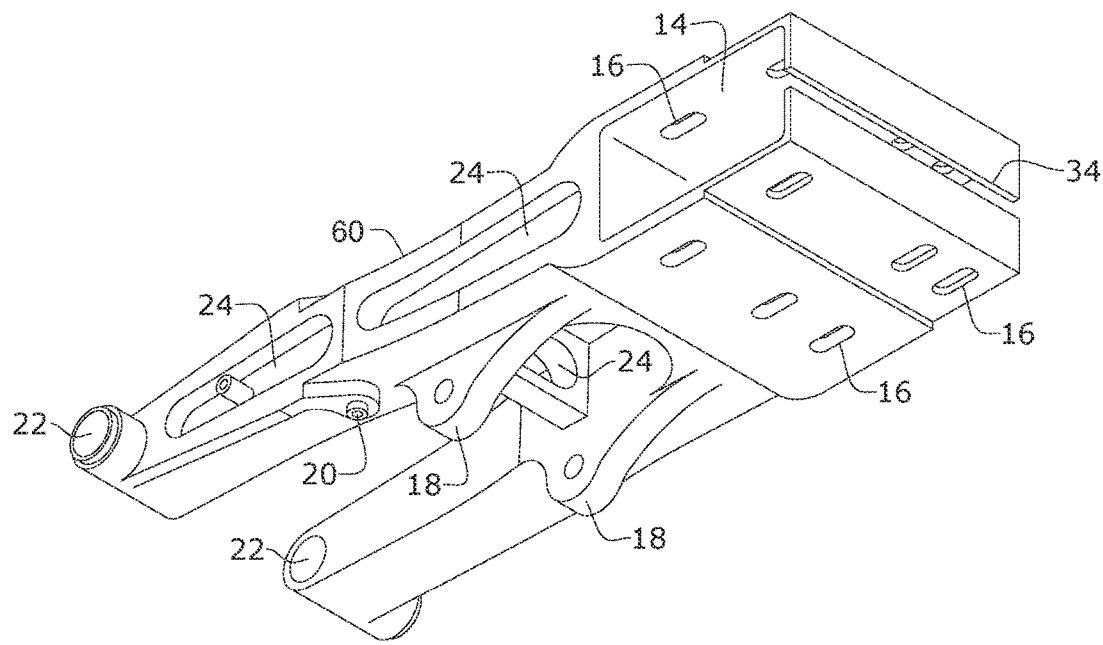
FIG. 4 is a bottom perspective view of an exemplary embodiment of the swing arm of the present invention.
Figure 5:
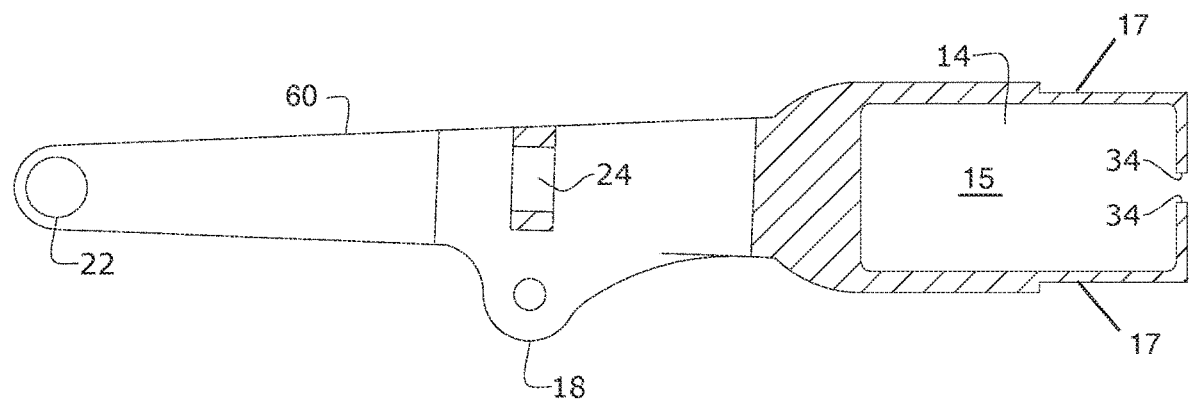
FIG. 5 is a section view of an exemplary embodiment of the present invention, taken along line 5-5 in FIG. 2.
Figure 6:
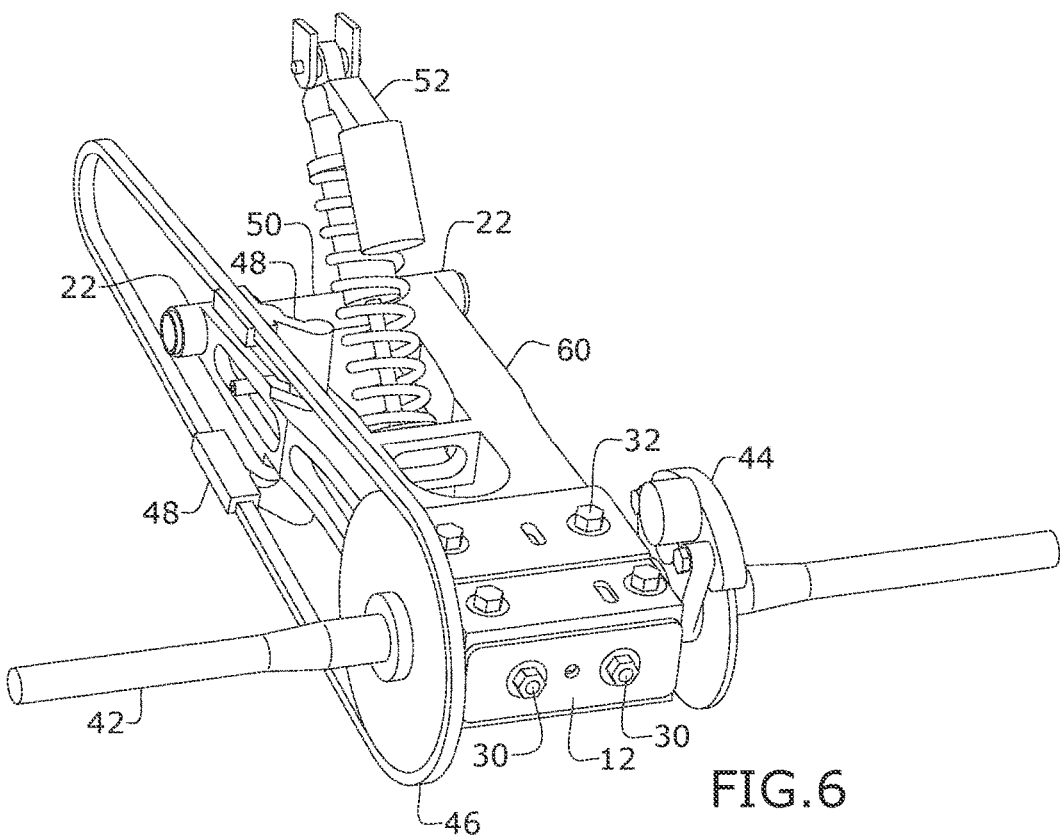
FIG. 6 is a perspective view of an exemplary embodiment of the present invention.
Figure 7:
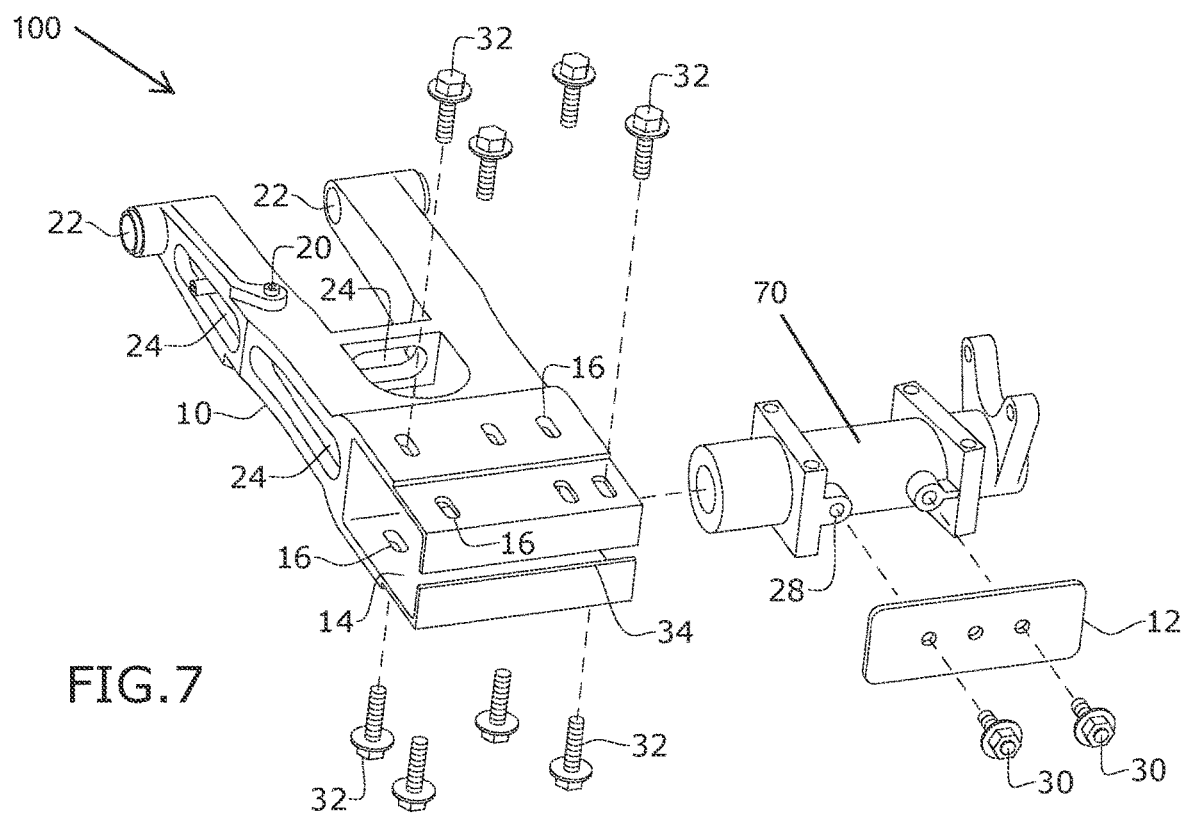
FIG. 7 is an exploded perspective view of an exemplary embodiment of the present invention.

It should be understood by those skilled in the art that the use of directional terms such as top (upper), bottom (lower), lateral, front, and the like are used in relation to the illustrative embodiments as they are depicted in the figures. Specifically, the upper direction being toward the top margin of FIG. 5, the lower direction being toward the bottom of FIG. 5, the lateral direction being directed into and/or out of the drawing sheet of FIG. 5, and thus a front direction directed toward the right-side margin of FIG. 5.

Broadly, an embodiment of the present invention provides an axle bearing carrier assembly having a swing arm of unitary construction that operatively associates with an adjustable tension plate for selectively connecting one of two different types of axle bearing carriers to the swing arm.

Referring now to FIGS. 1 through 7, the present invention may include an axle bearing carrier assembly 100 for an all-terrain vehicle (ATV) 38. The axle bearing carrier assembly 100 may include a unitary swing arm 10 and an adjustable tension plate 12. The swing arm 10 is dimensioned and adapted to house an axle bearing carrier 70, while the tension plate 12 operatively associates with the swing arm 10 to maintain tension on the axle bearing carrier 70 by way of adjustable fasteners 30, such as but not limited to adjustable bolts.

The swing arm 10 provides a rear portion 60 and a housing 14. The rear portion 60 may provide structure to operatively associate with a suspension system 52, such as a shock, by way of shock mounts 18 and bolt housings 22. The suspension system 52 may connect to the bolt housing 22 by way of a connector 50 (such as but not limited to a swing bolt). The rear portion 60 may provide weight reduction cutouts 24 as well as one or more chain guide mounts 20 for facilitating association with a complementary chain guide 48 of a drive chain 46.

The housing 14 may define a void dimensioned to receive the axle bearing carrier 70. The housing 14 may have one or more lateral side openings 15 facilitating the receipt of the axle bearing carrier 70. Top and bottom flanges 17 of the housing further define the top and bottom of the void, respectively. Each flange 17 may have a plurality of mounting openings 16. A front side of the housing 14 has an elongated plate opening 34. Elongated is understood to mean having a length (extending between the lateral sides) greater than a height (extending between the top and bottom sides). The plate opening 34 may or may not extend end to end from one lateral side to the other lateral side. In certain embodiments, the plate opening 34 may be discontinuous.

The axle bearing carrier 70 may be a single connection type, having a single connection point 26, or dual connection type, having two spaced apart connection points 28. When housed in the housing 14, the one or two connections points 26 or 28 of the axle bearing carrier 70 may be adjacent the elongated plate opening 34. As a result, the tension plate 12 having a plurality of interconnection points 13 enables one or more adjustable fasteners 30 to connect therethrough to the one or two connections points 26 and 28, thereby maintaining non-bearing tension of the axle bearing carrier 70. Similarly, a tow plate 36 can be associated with either the top and bottom flange 17 so that carrier bolts 32 can pass through holes in the tow plate 36 and through the mounting openings 16 of the flange 17 so as to engage mounting points on the top and bottom of the axle bearing carrier 70. As such, the axle bearing carrier 70 may operatively associate with the axle 42 and by extension the brakes 44 and the wheels 40.

A method of using the present invention may include the following. The axle bearing carrier assembly 100 disclosed above may be provided. A user may replace an existing swing arm with the swing arm 10 of the present invention, and then tighten the adjustable fasteners 30 that holds the tension plate 12 to the acquire a desired tension. The rectangular/elongated opening 34 enables a selective engagement between the tension plate 12 and the one or two connections points 26 and 28, respectively. The tension plate 12 is fitted to the outside face of the front of the housing 14 so that the elongated opening 34 aligns with the interconnection points 13 of the tension plate 12. Then the adjustable fasteners 30 will fit through the tension plate 12 and be connected into the desired type of axle bearing carrier 70 until the drive chain 46 fits to the axle 42 and is tightened to the user's needs.

The three-hole tension plate 12 is important as is stabilizes the axle bearing carrier 70 in place from moving laterally (side to side, left to right) and also facilitates allowing the drive chain 46 to be tightened to the user's needs. The swing arm 10 facilitates a highly durable platform where all the additional parts can be mounted to and not fail under extreme riding conditions. In operation, the swing arm 10 associates with the pre-existing parts of the ATV 38.

It should be understood, of course, that the foregoing relates to exemplary embodiments of the invention and that modifications may be made without departing from the spirit and scope of the invention as set forth in the following claims.

What is claimed is:

1. An axle bearing carrier assembly, the assembly comprising:
   a swing arm having a housing;
   the housing having a front side defining, in part, a void housing an axle bearing carrier, wherein the axle bearing carrier has one or more connection points;
   an elongated opening disposed along the front side so as to be vertically aligned with the one or more connection points;
   a tension plate having a plurality of interconnection points, wherein one or more of the plurality of interconnection points vertically align with the one or more connection points;
   a top flange and a bottom flange further defining the void, wherein each flange has a plurality of mounting openings; and
   a tow plate associated with the top flange or the bottom flange.

2. The assembly of claim 1, wherein the swing arm further comprises a rear portion for connection to a suspension system.

3. The assembly of claim 2, wherein the tension plate is on an opposing side of the front side relative to the axle bearing carrier.

4. The assembly of claim 3, further comprising an adjustable fastener extending through the tension plate, through the elongated opening, and connecting to one of the one or more connection points.

5. The assembly of claim 4, wherein the swing arm is a unitary construction.

* * * * *